(12) United States Patent
Sasaki et al.

(10) Patent No.: US 11,145,460 B2
(45) Date of Patent: *Oct. 12, 2021

(54) MULTILAYER CERAMIC ELECTRONIC COMPONENT

(71) Applicant: TAIYO YUDEN CO., LTD., Tokyo (JP)

(72) Inventors: Takashi Sasaki, Takasaki (JP); So Sato, Takasaki (JP); Yoshiaki Iijima, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 89 days.

This patent is subject to a terminal disclaimer.

(21) Appl. No.: 16/670,817

(22) Filed: Oct. 31, 2019

(65) Prior Publication Data

US 2020/0066448 A1    Feb. 27, 2020

Related U.S. Application Data

(63) Continuation of application No. 15/842,780, filed on Dec. 14, 2017, now Pat. No. 10,593,476.

(30) Foreign Application Priority Data

Dec. 22, 2016    (JP) .............................. JP2016-248783

(51) Int. Cl.
*H01G 4/224* (2006.01)
*H01G 4/232* (2006.01)
(Continued)

(52) U.S. Cl.
CPC ............... *H01G 4/224* (2013.01); *H01G 4/12* (2013.01); *H01G 4/232* (2013.01); *H01G 4/30* (2013.01);
(Continued)

(58) Field of Classification Search
CPC ........... H01G 4/224; H01G 4/30; H01G 4/232
See application file for complete search history.

(56) References Cited

U.S. PATENT DOCUMENTS 10,593,476 B2 * 3/2020 Sasaki .................... H01G 4/224
2006/0234022 A1   10/2006 Liu et al.
(Continued)

FOREIGN PATENT DOCUMENTS

JP          03091216 A  *  4/1991
JP          H08111349 A     4/1996
(Continued)

OTHER PUBLICATIONS

Final Office Action issued by U.S. Patent and Trademark Office, dated Feb. 26, 2019, for related U.S. Appl. No. 15/842,780 (9 pages).

(Continued)

*Primary Examiner* — Eric W Thomas
(74) *Attorney, Agent, or Firm* — Law Office of Katsuhiro Arai

(57) ABSTRACT

In an exemplary embodiment, in a multilayer ceramic capacitor 10, a first insulative layer 13-1 having parts A1, A2 covered by the first part 12b of each external electrode 12 is provided on one third-direction face, while a second insulative layer 13-2 having parts A3, A4 covered by the second part 12c of each external electrode 12 is provided on the other third-direction face, of the capacitor body 11 of the multilayer ceramic capacitor 10. The multilayer ceramic electronic component can prevent moisture intrusion into the component body as much as possible, even when the multilayer ceramic electronic component is made thin.

10 Claims, 6 Drawing Sheets

(51) Int. Cl.
    *H01G 4/30*         (2006.01)
    *H01G 4/12*         (2006.01)
    *H01G 4/012*       (2006.01)

(52) U.S. Cl.
    CPC .......... *H01G 4/012* (2013.01); *H01G 4/1227* (2013.01); *H01G 4/1236* (2013.01); *H01G 4/1245* (2013.01)

(56) References Cited

U.S. PATENT DOCUMENTS

| | | |
|---|---|---|
| 2010/0025075 A1 | 2/2010 | Feichtinger et al. |
| 2014/0022690 A1 | 1/2014 | Kim et al. |
| 2014/0285947 A1 | 9/2014 | Suga et al. |
| 2016/0024346 A1 | 1/2016 | Inoue et al. |
| 2016/0163461 A1 | 6/2016 | Chen et al. |
| 2017/0162322 A1 | 6/2017 | Park et al. |

FOREIGN PATENT DOCUMENTS

| | | |
|---|---|---|
| JP | H11251120 A | 9/1999 |
| JP | 2016149487 A | 8/2016 |
| KR | 20170065919 A | 6/2017 |

OTHER PUBLICATIONS

Non-Final Office Action issued by U.S. Patent and Trademark Office, dated Aug. 5, 2019, for U.S. Appl. No. 15/842,780 (13 pages).

Non-Final Office Action issued by U.S. Patent and Trademark Office, dated Jul. 23, 2018, for related U.S. Appl. No. 15/842,780 (14 pages).

\* cited by examiner

MULTILAYER CERAMIC ELECTRONIC COMPONENT

CROSS-REFERENCE TO RELATED APPLICATIONS

This application is a continuation of U.S. patent application Ser. No. 15/842,780, filed Dec. 14, 2017, which claims priority to Japanese Patent Application No. 2016-248783, filed Dec. 22, 2016, each disclosure of which is incorporated herein by reference in its entirety including any and all particular combinations of the features disclosed therein.

The applicant herein explicitly rescinds and retracts any prior disclaimers or disavowals made in any parent, child or related prosecution history with regard to any subject matter supported by the present application.

BACKGROUND

Field of the Invention

The present invention relates to a multilayer ceramic electronic component such as a multilayer ceramic capacitor, multilayer ceramic inductor, etc.

Description of the Related Art

A multilayer ceramic electronic component, such as a multilayer ceramic capacitor, multilayer ceramic inductor, etc., or specifically a multilayer ceramic capacitor, for example, generally comprises a capacitor body of roughly rectangular solid shape which has a capacitive part constituted by multiple internal electrode layers that are stacked together with dielectric layers in between, and a pair of external electrodes provided on the capacitor body. Some of the multiple internal electrode layers are connected to one of the external electrodes, while the remainder of the multiple internal electrode layers are connected to the other of the external electrodes.

Mounting patterns of the aforementioned multilayer ceramic capacitor include one where the multilayer ceramic capacitor is placed on the surface of a circuit board and connected to wiring, and another where the multilayer ceramic capacitor is placed inside a circuit board and connected to wiring, and particularly in the case of the latter, the multilayer ceramic capacitor must be thin (refer to Patent Literature 1 as mentioned below). However, even when the multilayer ceramic capacitor is thin, as mentioned above, the required capacitance is generally high.

One way to achieve a maximum capacitance with a thin multilayer ceramic capacitor is to minimize the thicknesses of the internal electrode layers and dielectric layers constituting the capacitive part of the capacitor body. However, this method is subject to technical limitations and therefore in many cases it is combined with a method to minimize the thickness of the dielectric margin parts present on both sides of the capacitive part.

However, reducing the thickness of each of the aforementioned dielectric margin parts, to 10 µm or less, for example, makes it easier for moisture to intrude into the capacitor body through each dielectric margin part, which gives rise to greater concerns that this moisture may corrode the internal electrode layers and cause functional problems. In other words, adopting a thin multilayer ceramic capacitor must be accompanied by ingenious structures that can prevent moisture intrusion into the capacitor body as much as possible.

It should be noted that the aforementioned functional failures due to moisture are not limited to multilayer ceramic capacitors, but they can also occur in the same manner in multilayer ceramic inductors and other multilayer ceramic electronic components, or specifically thin multilayer ceramic electronic components, comprising external electrodes that are provided on a component body of roughly rectangular solid shape having internal conductor layers.

Background Art Literatures

[Patent Literature 1] Japanese Patent Laid-open No. 2016-149487

SUMMARY

An object of the present invention is to provide a multilayer ceramic electronic component that can prevent moisture intrusion into the component body as much as possible, even when the multilayer ceramic electronic component is made thin.

Any discussion of problems and solutions involved in the related art has been included in this disclosure solely for the purposes of providing a context for the present invention, and should not be taken as an admission that any or all of the discussion were known at the time the invention was made.

To achieve the aforementioned object, the multilayer ceramic electronic component pertaining to the present invention represents a multilayer ceramic electronic component comprising external electrodes that are provided on a component body of roughly rectangular solid shape having internal conductor layers, wherein, when a direction across two opposing faces among the six faces of the component body is defined as the first direction, a direction across other two opposing faces is defined as the second direction, and a direction across the remaining two opposing faces is defined as the third direction, then the external electrodes each have a first part present on one third-direction face of the component body, and an insulative layer partially covered by the first part of the external electrode is provided on the one third-direction face of the component body.

According to the multilayer ceramic electronic component pertaining to the present invention, moisture intrusion into the component body can be prevented as much as possible, even when the multilayer ceramic electronic component is made thin.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

Figure 1:
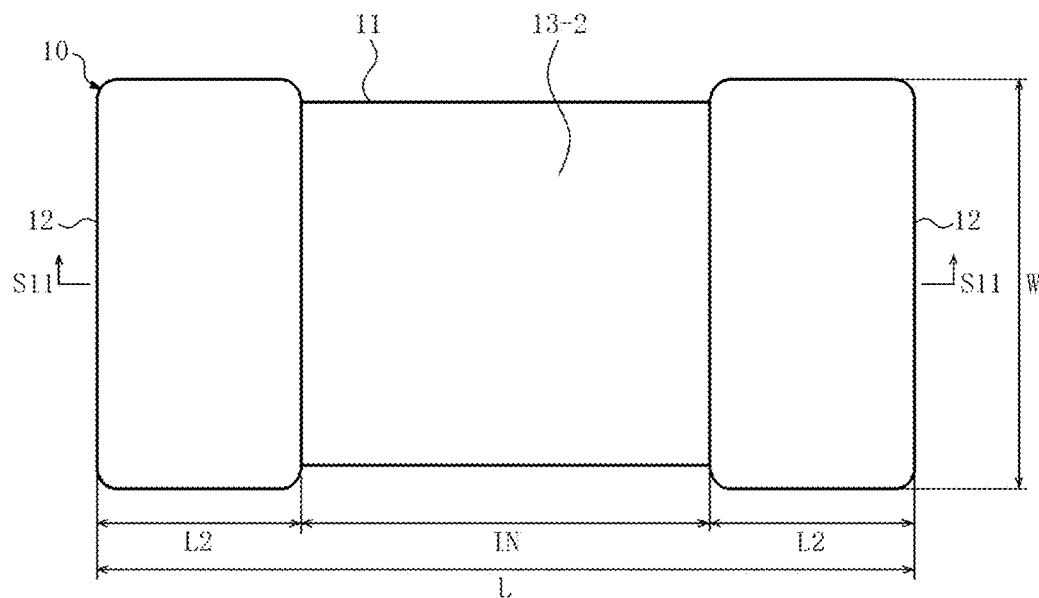
FIG. 1 is a plan view of the multilayer ceramic capacitor pertaining to the first embodiment of the present invention.

DESCRIPTION OF THE SYMBOLS 10, 20, 30—Multilayer ceramic capacitor, 11—Capacitor body, 11a—Capacitive part, 11a1—Internal electrode layer, 11a2—Dielectric layer, 11b—Dielectric margin part, 12—External electrode, 12a—Base part of the external electrode, 12b—First part of the external electrode, 12c—Second part of the external electrode, 12d—Third part of the external electrode, 12e—Fourth part of the external electrode, 13-1—First insulative layer, A1, A2, B1, B2, C1, C2—Part of the first insulative layer covered by the external electrode, 13-2—Second insulative layer, A3, A4, B3, B4, C3, C4—Part of the second insulative layer covered by the external electrode, 14—Base conductor film of the external electrode, 14a—Base part of the base conductor film, 14b—First part of the base conductor film, 14c—Second part of the base conductor film, 14d—Third part of the base conductor film, 14e—Fourth part of the base conductor film, 15—Surface conductor film of the external electrode, 15a—Base part of the surface conductor film, 15b—First part of the surface conductor film, 15c—Second part of the surface conductor film, 15d—Third part of the surface conductor film, 15e—Fourth part of the surface conductor film, 16, 16'—Second base conductor film of the external electrode, 16a—Base part of the second base conductor film, 16b—First part of the second base conductor film, 16c—Second part of the second base conductor film, 16d—Third part of the second base conductor film, 16e—Fourth part of the second base conductor film.

DETAILED DESCRIPTION OF EMBODIMENTS

First Embodiment

The first embodiment applies the present invention to a multilayer ceramic capacitor. First, FIGS. 1 to 5 are used to explain the structure of the multilayer ceramic capacitor 10 pertaining to the first embodiment of the present invention. It should be noted that, for the sake of convenience, in the following explanations the direction across two opposing faces (corresponding to the lateral direction in FIG. 1) among the six faces of the below-mentioned capacitor body 11 of roughly rectangular solid shape is denoted as the first direction, the direction across other two faces (corresponding to the vertical direction in FIG. 1) is denoted as the second direction, and the direction across the remaining two opposing faces (corresponding to the vertical direction in FIG. 2) is denoted as the third direction, while the dimensions along the respective directions are denoted as the first-direction dimension, second-direction dimension and third-direction dimension. For reference, the first-direction dimension L, second-direction dimension W, and third-direction dimension H of the prototype (multilayer ceramic capacitor) on which FIGS. 1 to 5 are based, are 1000 μm, 500 μm, and 150 μm, respectively.

This multilayer ceramic capacitor 10 comprises, in addition to a capacitor body 11 of roughly rectangular solid shape and external electrodes 12 respectively provided on both first-direction ends (left end and right end in FIGS. 1 to 4) of the capacitor body 11, a first insulative layer 13-1 provided on one third-direction face (bottom face in FIGS. 2, 3, and 5) of the capacitor body 11 and a second insulative layer 13-2 provided on the other third-direction face (top face in FIGS. 2, 3, and 5) of the capacitor body 11.

Figure 2:
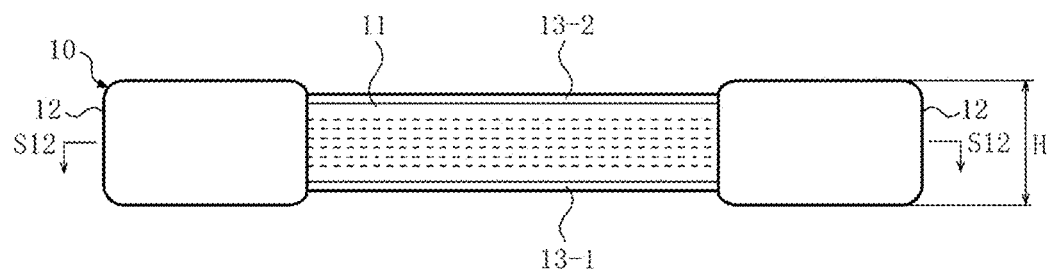
FIG. 2 is a side view of the multilayer ceramic capacitor shown in FIG. 1.
Figure 3:
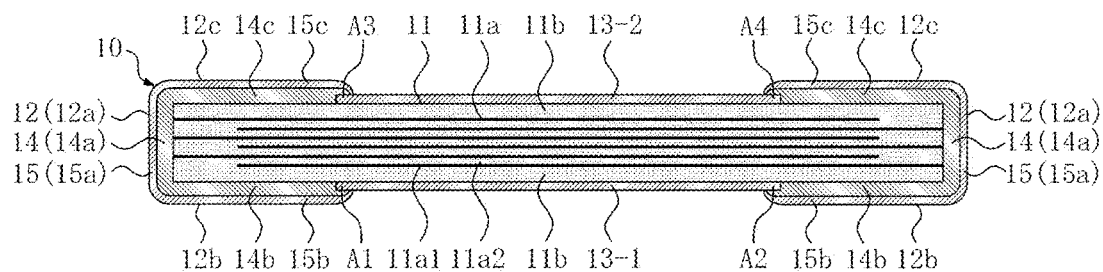
FIG. 3 is a cross-sectional view of FIG. 1 along line S11-S11.
Figure 5:
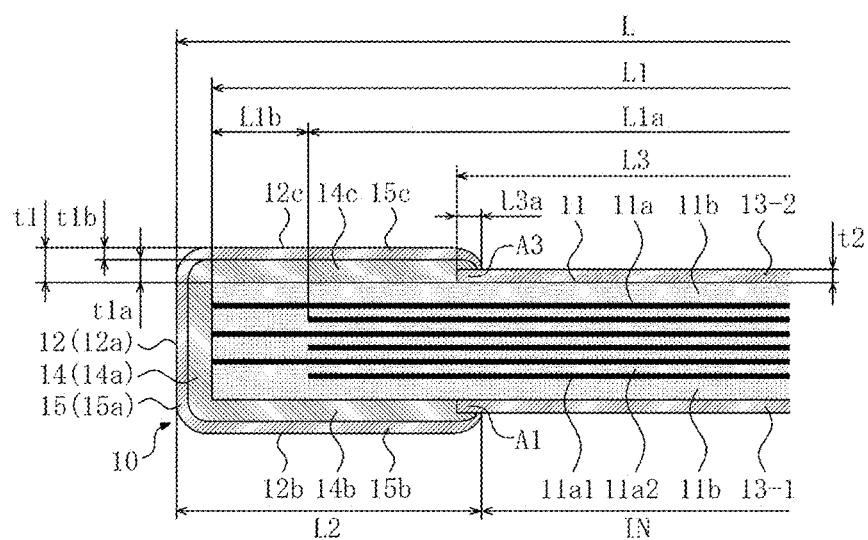
FIG. 5 is an enlarged view showing key parts of FIG. 3.

The capacitor body 11 has a capacitive part 11a constituted by multiple internal electrode layers 11a1 that are stacked together with dielectric layers 11a2 in between, and by dielectric margin parts 11b provided on both third-direction sides of the capacitive part 11a (refer to FIGS. 3 and 5). Some (odd-numbered ones from the top in FIG. 3) of the multiple internal electrode layers 11a1 are connected to one of the external electrodes 12 (left external electrode 12 in FIG. 3), while the remainder (even-numbered ones from the top in FIG. 3) of the multiple internal electrode layers 11a1 are connected to the other of the external electrodes 12 (right external electrode 12 in FIG. 3). It should be noted that, although a total of six internal electrode layers 11a1 are depicted in FIGS. 2, 3, and 5, for the sake of illustration, the number of internal electrode layers 11a1 is not limited in any way.

Each internal electrode layer 11a1 has an outline of roughly rectangular shape. The first-direction dimension L1a of each internal electrode layer 11a1 is smaller than the first-direction dimension L1 of the capacitor body 11 (refer to FIGS. 3 and 5). The first-direction dimension L1b corresponding to {First-direction dimension L1—First-direction dimension L1a} of each internal electrode layer 11a1 is a lead part where there is no adjacent, opposing internal electrode layer 11a1. In other words, each internal electrode layer 11a1 is connected to each external electrode 12 via this lead part. The second-direction dimension (not accompanied by symbol) of each internal electrode layer 11a1 is smaller than the second-direction dimension (not accompanied by symbol) of the capacitor body 11 (refer to FIG. 4). The third-direction dimension (not accompanied by symbol) of each internal electrode layer 11a1 is set in a range of 0.3 to 3 μm, for example.

Each dielectric layer 11a2 has an outline of roughly rectangular shape. The first-direction dimension (not accompanied by symbol) of each dielectric layer 11a2 is roughly the same as the first-direction dimension L1 of the capacitor body 11 (refer to FIGS. 3 and 5). The second-direction dimension (not accompanied by symbol) of each dielectric layer 11a2 is roughly the same as the second-direction dimension (not accompanied by symbol) of the capacitor body 11 (refer to FIG. 4). The third-direction dimension (not accompanied by symbol) of each dielectric layer 11a2 is set in a range of 0.3 to 3 μm, for example.

Each dielectric margin part 11b has an outline of roughly rectangular shape. The first-direction dimension (not accompanied by symbol) of each dielectric margin part 11b is roughly the same as the first-direction dimension L1 of the capacitor body 11 (refer to FIGS. 3 and 5). The second-direction dimension (not accompanied by symbol) of each dielectric margin part 11b is roughly the same as the second-direction dimension (not accompanied by symbol) of the capacitor body 11. The third-direction dimension (not accompanied by symbol) of each dielectric margin part 11b is set in a range of 5 to 10 μm, for example.

The primary component of each internal electrode layer 11a1 is nickel, copper, palladium, platinum, silver, gold, alloy thereof, or other metal material, for example. The primary component of each dielectric layer 11a2 and that of each dielectric margin part 11b, or the primary component of the capacitor body 11 excluding the internal electrode layers 11a1, is barium titanate, strontium titanate, calcium titanate, magnesium titanate, calcium zirconate, calcium zirconate titanate, barium zirconate, titanium oxide, or other dielectric material (dielectric ceramic material), for example. It should be noted that the primary component of each dielectric layer 11a2 may be the same as, or different from, the primary component of each dielectric margin part 11b.

Figure 4:
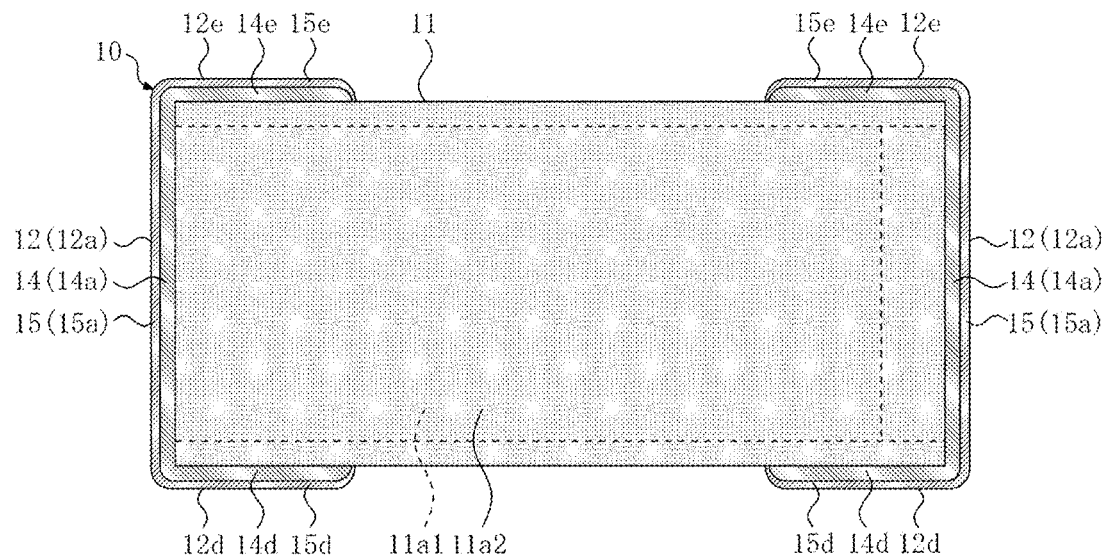
FIG. 4 is a cross-sectional view of FIG. 2 along line S12-S12.

Each external electrode 12 continuously has a base part 12a present on one first-direction face (left face in FIGS. 3 and 4) or the other first-direction face (right face in FIGS. 3 and 4) of the capacitor body 11, a first part 12b present on one third-direction face (bottom face in FIG. 3) of the capacitor body 11, a second part 12c present on the other third-direction face (top face in FIG. 3) of the capacitor body 11, a third part 12d present on one second-direction face (bottom face in FIG. 4) of the capacitor body 11, and a fourth part 12e present on the other second-direction face (top face in FIG. 4) of the capacitor body 11 (refer to FIGS. 3 to 5). The first-direction dimension L2 of each of the first part 12b through fourth part 12e of each external electrode 12 is set in a range of one-fifth to two-fifths the first-direction dimension L of the multilayer ceramic capacitor 10, for example. The first-direction dimension (not accompanied by symbol) of the base part 12a, third-direction dimension t1 of the first part 12b, and that of the second part 12c, and second-direction dimension (not accompanied by symbol) of the third part 12d, and that of the fourth part 12e, of each external electrode 12, are respectively set in a range of 3 to 30 μm, for example.

As is evident from FIGS. 3 to 5, each external electrode 12 is constituted by a base conductor film 14, and a surface conductor film 15 covering the base conductor film 14.

Each base conductor film 14 continuously has a base part 14a contacting one first-direction face (left face in FIGS. 3 and 4) or the other first-direction face (right face in FIGS. 3 and 4) of the capacitor body 11, a first part 14b contacting one third-direction face (bottom face in FIG. 3) of the capacitor body 11, a second part 14c contacting the other third-direction face (top face in FIG. 3) of the capacitor body 11, a third part 14d contacting one second-direction face (bottom face in FIG. 4) of the capacitor body 11, and a fourth part 14e contacting the other second-direction face (top face in FIG. 4) of the capacitor body 11 (refer to FIGS. 3 to 5). The first-direction dimension (not accompanied by symbol) of the base part 14a, third-direction dimension t1a of the first part 14b, and that of the second part 14c, and second-direction dimension (not accompanied by symbol) of the third part 14d, and that of fourth part 14e, of each base conductor film 14, are respectively set in a range of 2 to 15 μm, for example.

Each surface conductor film 15 continuously has a base part 15a contacting the surface of the base part 14a of each base conductor film 14, a first part 15b contacting the surface of the first part 14b of each base conductor film 14, a second part 15c contacting the surface of the second part 14c of each base conductor film 14, a third part 15d contacting the surface of the third part 14d of each base conductor film 14, and a fourth part 15e contacting the surface of the fourth part 14e of each base conductor film 14 (refer to FIGS. 3 to 5). The first-direction dimension (not accompanied by symbol) of the base part 15a, third-direction dimension t1b of the first part 15b, and that of the second part 15c, and second-direction dimension (not accompanied by symbol) of the third part 15d, and that of the fourth part 15e, of each surface conductor film 15, are respectively set in a range of 1 to 15 μm, for example.

The primary component of each base conductor film 14 is nickel, copper, palladium, platinum, silver, gold, alloy thereof, or other metal material, for example. Also, the primary component of each surface conductor film 15 is copper, nickel, tin, palladium, gold, zinc, alloy thereof, or other metal material, for example. It should be noted that, although each external electrode 12 depicted in FIGS. 3 to 5 is constituted by the base conductor film 14 and surface conductor film 15, for the sake of illustration, each external electrode 12 may also adopt a structure where one or more intermediate conductor film(s) of different primary component is/are present between the base conductor film 14 and surface conductor film 15. Also, by increasing the surface flatness by adjusting any surface irregularity manifesting in the first part 12b or second part 12c of each external electrode 12 to less than 2 μm, when the multilayer ceramic capacitor 10 is placed inside a circuit board (not illustrated) and connected to wiring, the via conductors on the wiring side can be bonded in a favorable manner to the surface of the first part 12b and that of the second part 12c of each external electrode 12, and also when through holes for the via conductors are formed by means of laser processing after the multilayer ceramic capacitor 10 has been placed inside the circuit board (not illustrated), the through holes can be formed in a favorable manner without being affected by any surface irregularity manifesting in the first part 12b or second part 12c of each external electrode 12.

The first insulative layer 13-1 and second insulative layer 13-2 each have an outline of roughly rectangular shape. The first-direction dimension L3 of the first insulative layer 13-1 is smaller than the first-direction dimension L1 of the capacitor body 11 and greater than the first-direction interval IN between the first parts 12b of the external electrodes 12 (refer to FIGS. 3 and 5). The first-direction dimension L3 of the second insulative layer 13-2 is smaller than the first-direction dimension L1 of the capacitor body 11 and greater than the first-direction interval IN between the second parts 12c of the external electrodes 12 (refer to FIGS. 3 and 5). The second-direction dimension (not accompanied by symbol) of the first insulative layer 13-1 and that of the second insulative layer 13-2 are roughly the same as the second-direction dimension (not accompanied by symbol) of the capacitor body 11, respectively. The third-direction dimension t2 of the first insulative layer 13-1 is smaller than the third-direction dimension t1 of the first part 12b of each external electrode 12, or specifically the third-direction dimension t1a of the first part 14b of each base conductor film 14 (refer to FIGS. 3 and 5). The third-direction dimension t2 of the second insulative layer 13-2 is smaller than the third-direction dimension t1 of the second part 12c of each external electrode 12, or specifically the third-direction dimension t1a of the second part 14c of each base conductor film 14 (refer to FIGS. 3 and 5). The third-direction dimension t2 of the first insulative layer 13-1 and that of the second insulative layer 13-2 are respectively set in a range of 1 to 6 μm, for example.

In other words, the first insulative layer 13-1 has, on both of its first-direction ends, parts A1, A2 that are covered by the first part 12b of each external electrode 12 (refer to FIG. 3). To be specific, these parts A1, A2 are covered in such a way that their other third-direction face (top face in FIG. 3) is contacting one third-direction face (bottom face in FIG. 3) of the capacitor body 11 and their one third-direction face (bottom face in FIG. 3) is contacting the first part 14b of each base conductor film 14. On the other hand, the second insulative layer 13-2 has, on both of its first-direction ends, parts A3, A4 that are covered by the second part 12c of each external electrode 12 (refer to FIG. 3). To be specific, these parts A3, A4 are covered in such a way that their one third-direction face (bottom face in FIG. 3) is contacting the other third-direction face (top face in FIG. 3) of the capacitor body 11 and their other third-direction face (top face in FIG. 3) is contacting the second part 14c of each base conductor film 14.

The first-direction dimensions L3a of the parts A1 to A4 are set in a range of 5 to 15 μm, for example (refer to FIG. 5). All of the first-direction dimensions L3a of the parts A1 to A4 may be the same or all of the dimensions may be different, or two of the parts A1 to A4 may have the same dimension with the remaining two having the same dimension or different dimensions, or three of the parts A1 to A4 may have the same dimension with the remaining part having a different dimension.

The primary component of the first insulative layer 13-1 and that of the second insulative layer 13-2 are barium titanate, strontium titanate, calcium titanate, magnesium titanate, calcium zirconate, calcium zirconate titanate, barium zirconate, titanium oxide or other dielectric material (dielectric ceramic material), for example, and preferably the same as the primary component of each dielectric margin part 11b of the capacitor body 11. It should be noted that the primary component of the first insulative layer 13-1 and that of the second insulative layer 13-2 may be different from the primary component of each dielectric margin part 11b. Also, the primary component of the first insulative layer 13-1 and that of the second insulative layer 13-2 may be the same or different. Furthermore, any insulative material other than dielectric material, such as synthetic resin material or glass material, etc., may be used for the primary component of the first insulative layer 13-1 and that of the second insulative layer 13-2.

Figure 6A:
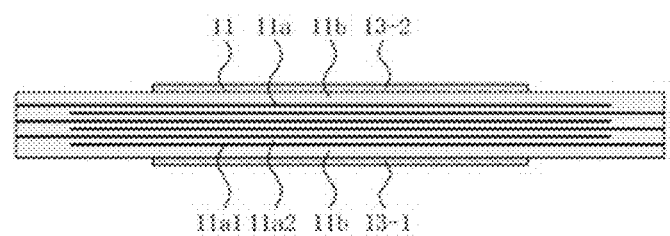
FIGS. 6A to 6C are drawings explaining an example of how the multilayer ceramic capacitor shown in FIGS. 1 to 5 is manufactured.
Figure 6B:
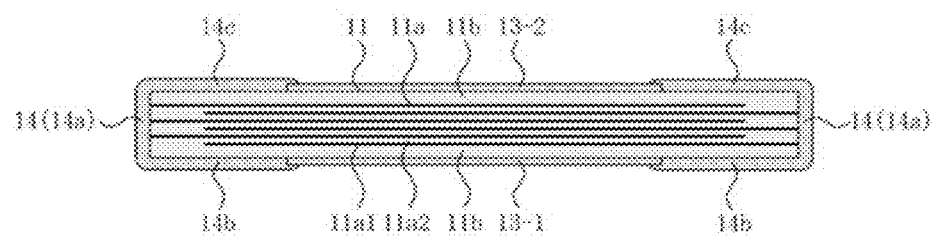
Figure 6C:
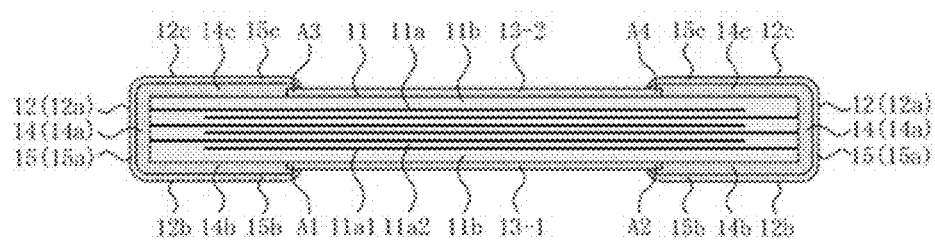
Figure 7:
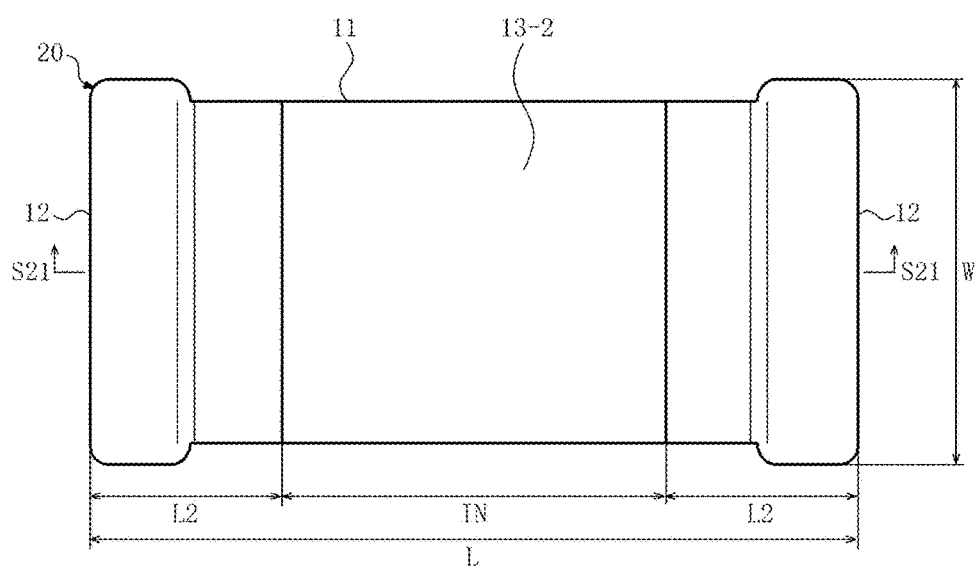
FIG. 7 is a plan view of the multilayer ceramic capacitor pertaining to the second embodiment of the present invention.
Figure 8:
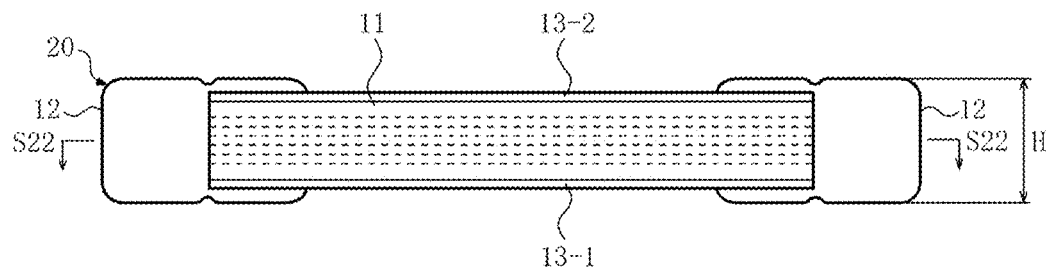
FIG. 8 is a side view of the multilayer ceramic capacitor shown in FIG. 7.

Next, an example of how the multilayer ceramic capacitor 10 is manufactured, or specifically an example of manufacturing method when the primary component of the capacitor body 11 excluding the internal electrode layers 11a1, primary component of the first insulative layer 13-1, and that of the second insulative layer 13-2 are barium titanate, the primary component of each internal electrode layer 11a1 and that of each base conductor film 14 are nickel, and the primary component of each surface conductor film 15 is tin, is explained using FIGS. 6A to 6C and quoting the symbols shown in FIGS. 1 to 5. The manufacturing method explained here is only an example and does not limit in any way how the multilayer ceramic capacitor 10 is manufactured.

For the manufacturing, first a ceramic slurry containing barium titanate powder, organic solvent, organic binder, dispersant, etc., and an electrode paste containing nickel powder, organic solvent, organic binder, dispersant, etc., are prepared.

Next, the ceramic slurry is coated on the surface of a carrier film and then dried, to produce a first sheet having a green sheet formed on the surface of the carrier film. Also, the electrode paste is printed on the surface of the green sheet of a first sheet and then dried, to produce a second sheet having unsintered, matrix or zigzag internal electrode layer patterns formed on the surface of the green sheet of the first sheet. Furthermore, the ceramic slurry is printed on the surface of the green sheet of a first sheet and then dried, to produce a third sheet having unsintered, striped insulative layer patterns formed on the surface of the green sheet of the first sheet.

Next, a specified number of unit sheets taken from the green sheet of the first sheet are stacked and thermally compressed one by one, to form an area corresponding to one dielectric margin part 11b. Then, a specified number of unit sheets (including unsintered internal electrode layer patterns) taken from the green sheet of the second sheet are stacked and thermally compressed one by one, to form an area corresponding to the capacitive part 11a. Then, a specified number of unit sheets taken from the green sheet of the first sheet are stacked and thermally compressed one by one, to form an area corresponding to the other dielectric margin part 11b. Then, unit sheets (including unsintered insulative layer patterns) taken from the green sheet of the third sheet are stacked and thermally compressed on both sides of the above sheets in their stacking direction, after which the entire sheets are thermally compressed one last time, to produce an unsintered multilayer sheet (refer to FIG. 6A). It should be noted that, although the unsintered multilayer sheet depicted in FIG. 6A corresponds to one multilayer ceramic capacitor 10 as mentioned above for the sake of illustration, the actual unsintered multilayer sheet has sufficient size to allow multiple multilayer ceramic capacitors 10 to be taken from it.

Next, the unsintered multilayer sheet having sufficient size to allow multiple multilayer ceramic capacitors to be taken from it, is cut into a grid to produce unsintered capacitor bodies (11) (refer to FIG. 6A). On each such unsintered capacitor body (11), an unsintered first insulative layer (13-1) is provided on one third-direction face (bottom face in FIG. 6A), and an unsintered second insulative layer (13-2) is provided on the other third-direction face (top face in FIG. 6A).

Next, both first-direction ends of the unsintered capacitor body (11) having the unsintered first insulative layer (13-1) and unsintered second insulative layer (13-2) are dipped in or otherwise coated with the electrode paste, and then the electrode paste is dried, to produce unsintered base conductor films (14) (refer to FIG. 6B). These unsintered base conductor films (14) are produced in such a way that the first part (14b) and second part (14c) of each of the unsintered base conductor films (14) are slightly covering both first-direction ends of the unsintered first insulative layer (13-1) and both first-direction ends of the unsintered second insulative layer (13-2).

Next, the multiple unsintered capacitor bodies (11), each having the unsintered first insulative layer (13-1), unsintered second insulative layer (13-2), and two unsintered base conductor films (14), are introduced to a sintering oven and sintered (including a binder removal process and a sintering process) all at once in a reducing ambience based on a temperature profile appropriate for barium titanate and nickel, to produce capacitor bodies 11, each having a first insulative layer 13-1, a second insulative layer 13-2, and two base conductor films 14 (refer to FIG. 6B).

Next, a surface conductor film 15 (primary component: tin) covering the surface of each base conductor film 14 is produced according to the wet plating method or dry plating method (refer to FIG. 6C). This completes the manufacturing of the multilayer ceramic capacitor 10.

It should be noted that each base conductor film 14 may also be produced by sintering the unsintered capacitor body (11) shown in FIG. 6A to produce a capacitor body 11 having a first insulative layer 13-1 and a second insulative layer 13-2, and then dipping or otherwise coating both first-direction ends of this capacitor body 11 in/with the electrode paste and drying the electrode paste, followed by baking.

Next, the effects achieved by the multilayer ceramic capacitor 10 are explained.

[Effect 1-1]

Even when the multilayer ceramic capacitor 10 is made thin, or specifically when the third-direction dimension of each dielectric margin part 11b is made small, moisture intrusion into the capacitor body 11 from both third-direction faces of the capacitor body 11 can be prevented as much as possible by the first insulative layer 13-1 which has the parts A1, A2 provided on one third-direction face of the capacitor body 11 and is covered by the first part 12b of each external electrode 12, and also by the second insulative layer 13-2 which has the parts A3, A4 provided on the other third-direction face of the capacitor body 11 and covered by the second part 12c of each external electrode 12. Furthermore, because the parts A1, A2 of the first insulative layer 13-1 are covered in such a way that their other third-direction face is contacting one third-direction face of the capacitor body 11 and their one third-direction face is contacting the first part 14b of the base conductor film 14, and also because the parts A3, A4 of the second insulative layer 13-2 are covered in such a way that their one third-direction face is contacting the other third-direction face of the capacitor body 11 and their other third-direction face (top face in FIG. 3) is contacting the second part 14c of the base conductor film 14, moisture intrusion into the capacitor body 11 from around both first-direction ends of the first insulative layer 13-1 and around both first-direction ends of the second insulative layer 13-2, can also be prevented as much as possible.

[Effect 1-2]

Also, because the third-direction dimension t2 of the first insulative layer 13-1 is smaller than the third-direction dimension t1 of the first part 12b of each external electrode 12 while the third-direction dimension t2 of the second insulative layer 13-2 is smaller than the third-direction dimension t1 of the second part 12c of each external electrode 12, or specifically because the third-direction dimension t2 of the first insulative layer 13-1 is smaller than the third-direction dimension t1a of the first part 14b of each base conductor film 14 while the third-direction dimension t2 of the second insulative layer 13-2 is smaller than the third-direction dimension t1a of the second part 14c of each base conductor film 14, any increase in the third-direction dimension t1 of the first part 12b or increase in the third-direction dimension t1 of the second part 12c, of each external electrode 12, or in other words any increase in the third-direction dimension H of the multilayer ceramic capacitor 10, can be suppressed without fail.

[Effect 1-3]

Furthermore, an action to supplement the strength of the capacitor body 11 is achieved by the first insulative layer 13-1 provided on one third-direction face, and the second insulative layer 13-2 provided on the other third-direction face, of the capacitor body 11, which means that the strength of the capacitor body 11 can be improved even when the third-direction dimension of the capacitor body 11 is made small in order to make the multilayer ceramic capacitor 10 thin.

[Effect 1-4]

Furthermore, the parts A1, A2 of the first insulative layer 13-1 are covered by the first part 14b of the base conductor film 14 of each external electrode 12, while the parts A3, A4 of the second insulative layer 13-2 are covered by the second part 14c of the base conductor film 14 of each external electrode 12, which means that, even when a surface conductor film 15 is produced on the surface of each base conductor film 14 according to the wet plating method or dry plating method, each surface conductor film 15 can be produced in an appropriate manner.

Second Embodiment

The second embodiment applies the present invention to a multilayer ceramic capacitor. First, FIGS. 7 to 11 are used to explain the structure of the multilayer ceramic capacitor 20 pertaining to the second embodiment of the present invention. It should be noted that, for the sake of convenience, in the following explanations the direction across two opposing faces (corresponding to the lateral direction in FIG. 7) among the six faces of the below-mentioned capacitor body 11 of roughly rectangular solid shape is denoted as the first direction, the direction across other two faces (corresponding to the vertical direction in FIG. 7) is denoted as the second direction, and the direction across the remaining two opposing faces (corresponding to the vertical direction in FIG. 8) is denoted as the third direction, while the dimensions along the respective directions are denoted as the first-direction dimension, second-direction dimension, and third-direction dimension. Also, in FIGS. 7 to 11, the same symbols are used for those parts having the same names as the corresponding parts of the multilayer ceramic capacitor 10. For reference, the first-direction dimension L, second-direction dimension W, and third-direction dimension H of the prototype (multilayer ceramic capacitor) on which FIGS. 7 to 11 are based, are 1000 μm, 500 μm, and 150 μm, respectively.

This multilayer ceramic capacitor 20 comprises, in addition to a capacitor body 11 of roughly rectangular solid shape and external electrodes 12 respectively provided on both first-direction ends (left end and right end in FIGS. 7 to 10) of the capacitor body 11, a first insulative layer 13-1 provided on one third-direction face (bottom face in FIGS. 8, 9, and 11) of the capacitor body 11, and a second insulative layer 13-2 provided on the other third-direction face (top face in FIGS. 8, 9, and 11) of the capacitor body 11.

The structure of the capacitor body 11 is the same as the structure of the capacitor body 11 of the multilayer ceramic capacitor 10 and therefore not explained.

Figure 9:
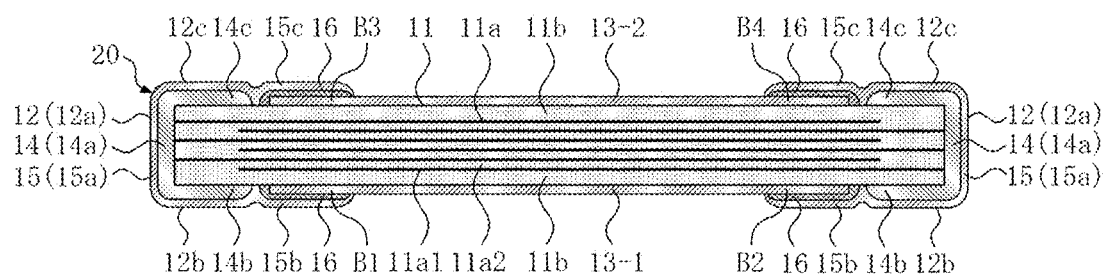
FIG. 9 is a cross-sectional view of FIG. 7 along line S21-S21.
Figure 10:
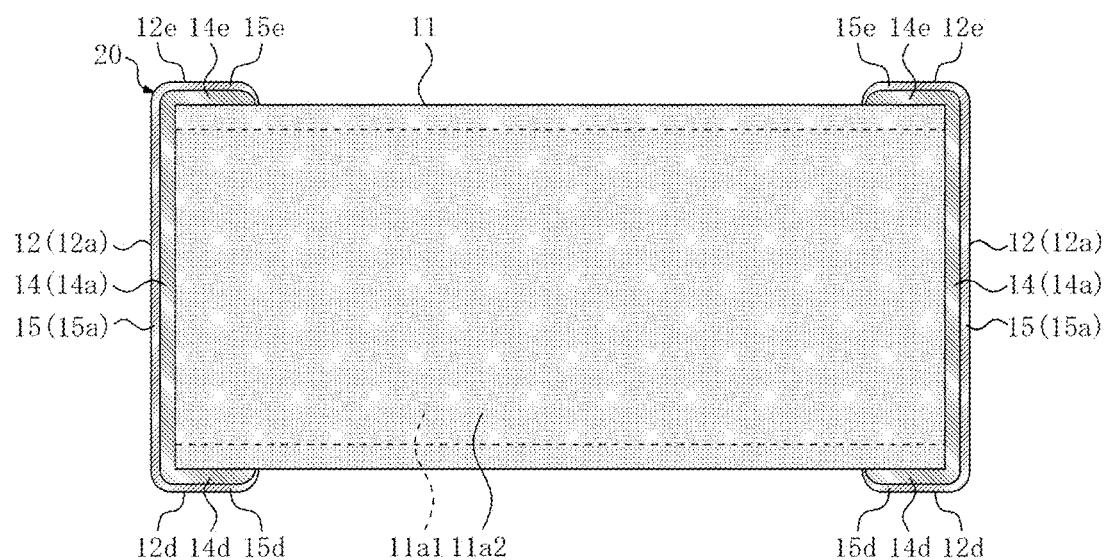
FIG. 10 is a cross-sectional view of FIG. 8 along line S22-S22.
Figure 11:
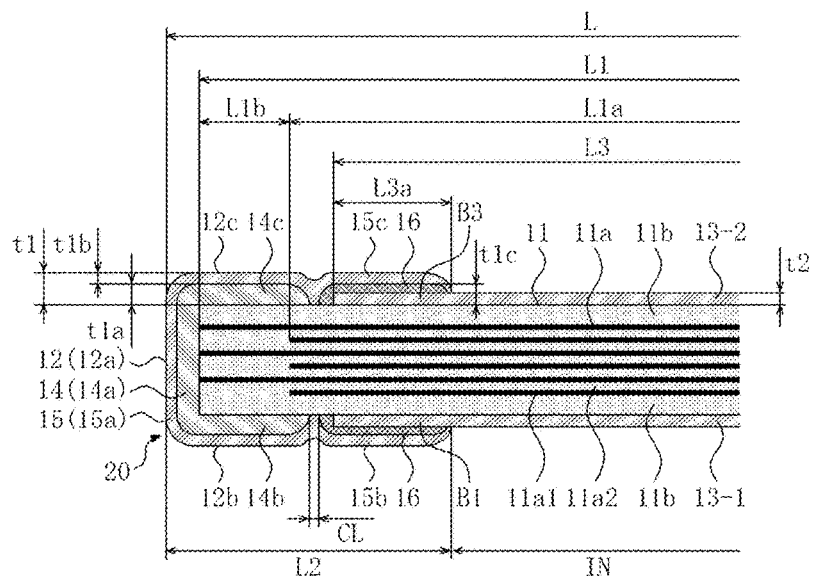
FIG. 11 is an enlarged view showing key parts of FIG. 9.

Each external electrode 12 continuously has a base part 12a present on one first-direction face (left face in FIGS. 9 and 10) or the other first-direction face (right face in FIGS. 9 and 10) of the capacitor body 11, a first part 12b present on one third-direction face (bottom face in FIG. 9) of the capacitor body 11, a second part 12c present on the other third-direction face (top face in FIG. 9) of the capacitor body 11, a third part 12d present on one second-direction face (bottom face in FIG. 10) of the capacitor body 11, and a fourth part 12e present on the other second-direction face (top face in FIG. 10) of the capacitor body 11 (refer to FIGS. 9 to 11). The first-direction dimension L2 of the first part 12b, and that of the second part 12c, of each external electrode 12, are set in a range of one-fifth to two-fifths the first-direction dimension L of the multilayer ceramic capacitor 10, for example. The first-direction dimension (not accompanied by symbol) of the third part 12d, and that of the fourth part 12e, of each external electrode 12, are smaller than the first-direction dimension L2 of the first part 12b or that of the second part 12c. The first-direction dimension (not accompanied by symbol) of the base part 12a, third-direction dimension t1 of the first part 12b, and that of the second part 12c, and second-direction dimension (not accompanied by symbol) of the third part 12d, and that of the fourth part 12e, of each external electrode 12, are respectively set in a range of 3 to 30 μm, for example.

As is evident from FIGS. 9 to 11, each external electrode 12 is constituted by a base conductor film 14, two second base conductor films 16, and a surface conductor film 15 covering the base conductor film 14 and two second base conductor films 16. The two second base conductor films 16 are provided on one third-direction face (bottom face in FIGS. 9 and 11) and the other third-direction face (top face in FIGS. 9 and 11) of the capacitor body 11, respectively.

Each base conductor film 14 continuously has a base part 14a contacting one first-direction face (left face in FIGS. 9 and 10) or the other first-direction face (right face in FIGS. 9 and 10) of the capacitor body 11, a first part 14b contacting one third-direction face (bottom face in FIG. 9) of the capacitor body 11, a second part 14c contacting the other third-direction face (top face in FIG. 9) of the capacitor body 11, a third part 14d contacting one second-direction face (bottom face in FIG. 10) of the capacitor body 11, and a fourth part 14e contacting the other second-direction face (top face in FIG. 10) of the capacitor body 11 (refer to FIGS. 9 to 11). The first-direction dimension (not accompanied by symbol) of each of the first part 14b through fourth part 14e of each base conductor film 14 is set in a range of one-fifth to four-fifths the first-direction dimension L2 of the first part 12b and that of the second part 12c, of each external electrode 12, for example. The first-direction dimension (not accompanied by symbol) of the base part 14a, third-direction dimension t1a of the first part 14b, and that of the second part 14c, and second-direction dimension (not accompanied by symbol) of the third part 14d, and that of fourth part 14e, of each base conductor film 14, are respectively set in a range of 2 to 15 μm, for example.

Each second base conductor film 16 has an outline of roughly rectangular shape. On each external electrode 12, each second base conductor film 16 is separated inward by a clearance CL from the first part 14b or second part 14c of each base conductor film 14, and covers each of the two first-direction ends of the first insulative layer 13-1 or second insulative layer 13-2 (refer to FIGS. 9 and 11). The first-direction dimension (not accompanied by symbol) of each second base conductor film 16 is smaller than the first-direction dimension L2 of the first part 12b and that of the second part 12c of each external electrode 12. The second-direction dimension (not accompanied by symbol) of each second base conductor film 16 is roughly the same as the second-direction dimension (not accompanied by symbol) of the capacitor body 11. The clearance CL is set to the minimum dimension that prevents the first part 14b or second part 14c of each base conductor film 14 from contacting each second base conductor film 16, such as 4 μm or thereabouts. The third-direction dimension t1c of each second base conductor film 16 is set in a range of 2 to 15 μm, for example.

Each surface conductor film 15 continuously has a base part 15a contacting the surface of the base part 14a of each base conductor film 14, a first part 15b contacting the surface of the first part 14b of each base conductor film 14, and the surface of a second base conductor film 16 (second base conductor film 16 on the bottom side in FIGS. 9 and 11), a second part 15c contacting the surface of the second part 14c of each base conductor film 14 and the surface of a second base conductor film 16 (second base conductor film 16 on the top side in FIGS. 9 and 11), a third part 15d contacting the surface of the third part 14d of each base conductor film 14, and a fourth part 15e contacting the surface of the fourth part 14e of each base conductor film 14 (refer to FIGS. 9 to 11). The first-direction dimension (not accompanied by symbol) of the base part 15a, third-direction dimension t1b of the first part 15b and that of the second part 15c, and second-direction dimension (not accompanied by symbol) of the third part 15d and that of the fourth part 15e, of each surface conductor film 15, are respectively set in a range of 1 to 15 μm, for example.

As mentioned above, each external electrode 12 has a clearance CL between the first part 14b of each base conductor film 14 and each second base conductor film 16, and also between the second part 14c of each base conductor film 14 and each second base conductor film 16, in order to prevent the two from contacting each other, and therefore a groove (not accompanied by symbol) based on this clearance CL manifests on the surface of the first part 15b, and also on the surface of the second part 15c, of each surface conductor film 15, regardless of how the surface conductor film 15 is produced. The third-direction dimension of this groove can be kept to 1 μm or less when the aforementioned clearance CL is set to the minimum dimension that prevents the first part 14b and second part 14c of each base conductor film 14 from contacting each second base conductor film 16. This means that, when the multilayer ceramic capacitor 20 is placed on the surface of or inside a circuit board (not illustrated) and connected to wiring, the grooves manifesting on the surfaces of the first part 15b and second part 15c of each surface conductor film 15 do not interfere with the connections.

The primary component of each base conductor film 14 and that of each second base conductor film 16 are nickel, copper, palladium, platinum, silver, gold, alloy thereof, or other metal material, for example. It should be noted that the primary component of each base conductor film 14 and that of each second base conductor film 16 may be the same or different. Also, the primary component of each surface conductor film 15 is copper, nickel, tin, palladium, gold, zinc, alloy thereof, or other metal material, for example. It should be noted that, although each external electrode 12 depicted in FIGS. 9 to 11 is constituted by the base conductor film 14, second base conductor film 16, and surface conductor film 15, for the sake of illustration, each external electrode 12 may also adopt a structure where one or more intermediate conductor film(s) of different primary component is/are present between the base conductor film 14/second base conductor film 16 and the surface conductor film 15. Also, by increasing the surface flatness by adjusting any surface irregularity manifesting in the first part 12b or second part 12c of each external electrode 12 to less than 2 μm, when the multilayer ceramic capacitor 20 is placed inside a circuit board (not illustrated) and connected to wiring, the via conductors on the wiring side can be bonded in a favorable manner to the surface of the first part 12b and that of the second part 12c of each external electrode 12, and also when through holes for the via conductors are formed by means of laser processing after the multilayer ceramic capacitor 20 has been placed inside the circuit board (not illustrated), the through holes can be formed in a favorable manner without being affected by any surface irregularity manifesting in the first part 12b or second part 12c of each external electrode 12.

The first insulative layer 13-1 and second insulative layer 13-2 each have an outline of roughly rectangular shape. The first-direction dimension L3 of the first insulative layer 13-1 is smaller than the first-direction dimension L1 of the capacitor body 11 and greater than the first-direction interval IN between the first parts 12b of the external electrodes 12 (refer to FIGS. 9 and 11). The first-direction dimension L3 of the second insulative layer 13-2 is smaller than the first-direction dimension L1 of the capacitor body 11 and greater than the first-direction interval IN between the second parts 12c of the external electrodes 12 (refer to FIGS. 9 and 11). The second-direction dimension (not accompanied by symbol) of the first insulative layer 13-1 and that of the second insulative layer 13-2 are roughly the same as the second-direction dimension (not accompanied by symbol) of the capacitor body 11, respectively. The third-direction dimension t2 of the first insulative layer 13-1 is smaller than the third-direction dimension t1 of the first part 12b of each external electrode 12, or specifically the third-direction dimension t1c of each second base conductor film 16 (refer to FIGS. 9 and 11). The third-direction dimension t2 of the second insulative layer 13-2 is smaller than the third-direction dimension t1 of the second part 12c of each external electrode 12, or specifically the third-direction dimension t1c of each second base conductor film 16 (refer to FIGS. 9 and 11). The third-direction dimension t2 of the first insulative layer 13-1 and that of the second insulative layer 13-2 are respectively set in a range of 1 to 6 μm, for example.

In other words, the first insulative layer 13-1 has, on both of its first-direction ends, parts B1, B2 that are covered by the first part 12b of each external electrode 12 (refer to FIG. 9). To be specific, these parts B1, B2 are covered in such a way that their other third-direction face (top face in FIG. 9) is contacting one third-direction face (bottom face in FIG. 9) of the capacitor body 11 and their one third-direction face (bottom face in FIG. 9) is contacting each second base conductor film 16. On the other hand, the second insulative layer 13-2 has, on both of its first-direction ends, parts B3, B4 that are covered by the second part 12c of each external electrode 12 (refer to FIG. 9). To be specific, these parts B3, B4 are covered in such a way that their one third-direction face (bottom face in FIG. 9) is contacting the other third-direction face (top face in FIG. 9) of the capacitor body 11 and their other third-direction face (top face in FIG. 9) is contacting each second base conductor film 16.

The first-direction dimensions L3a of the parts B1 to B4 are set in a range of 50 to 150 μm, for example (refer to FIG. 5). All of the first-direction dimensions L3a of the parts B1 to B4 may be the same or all of the dimensions may be different, or two of the parts B1 to B4 may have the same dimension with the remaining two having the same dimension or different dimensions, or three of the parts B1 to B4 may have the same dimension with the remaining part having a different dimension.

The primary component of the first insulative layer 13-1 and that of the second insulative layer 13-2 are barium titanate, strontium titanate, calcium titanate, magnesium titanate, calcium zirconate, calcium zirconate titanate, barium zirconate, titanium oxide, or other dielectric material (dielectric ceramic material), for example, and preferably the same as the primary component of each dielectric margin part 11b of the capacitor body 11. It should be noted that the primary component of the first insulative layer 13-1 and that of the second insulative layer 13-2 may be different from the primary component of each dielectric margin part 11b. Also, the primary component of the first insulative layer 13-1 and that of the second insulative layer 13-2 may be the same or different. Furthermore, any insulative material other than dielectric material, such as synthetic resin material or glass material, etc., may be used for the primary component of the first insulative layer 13-1 and that of the second insulative layer 13-2.

Figure 12A:
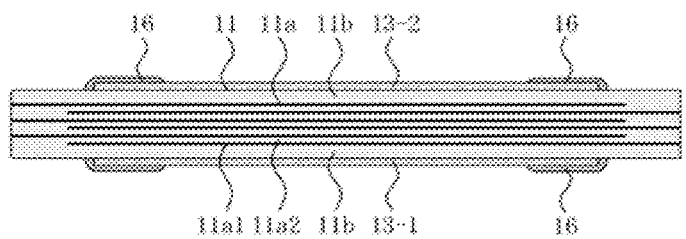
FIGS. 12A to 12C are drawings explaining an example of how the multilayer ceramic capacitor shown in FIGS. 7 to 11 is manufactured.
Figure 12B:
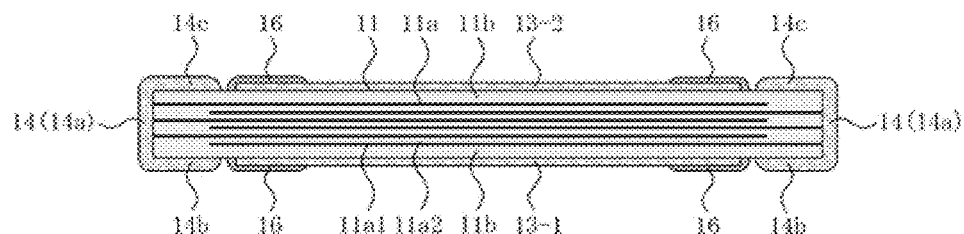
Figure 12C:
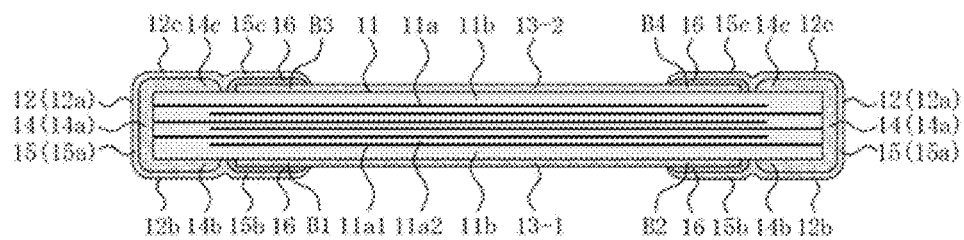

Next, an example of how the multilayer ceramic capacitor 20 is manufactured, or specifically an example of manufacturing method when the primary component of the capacitor body 11 excluding the internal electrode layers 11a1, primary component of the first insulative layer 13-1, and that of the second insulative layer 13-2 are barium titanate, the primary component of each internal electrode layer 11a1, that of each base conductor film 14, and that of each second base conductor film 16 are nickel, and the primary component of each surface conductor film 15 is tin, is explained using FIGS. 12A to 12C and quoting the symbols shown in FIGS. 7 to 11. The manufacturing method explained here is only an example and does not limit in any way how the multilayer ceramic capacitor 20 is manufactured.

For the manufacturing, first a ceramic slurry containing barium titanate powder, organic solvent, organic binder, dispersant, etc., and an electrode paste containing nickel powder, organic solvent, organic binder, dispersant, etc., are prepared.

Next, the ceramic slurry is coated on the surface of a carrier film and then dried, to produce a first sheet having a green sheet formed on the surface of the carrier film. Also, the electrode paste is printed on the surface of the green sheet of a first sheet and then dried, to produce a second sheet having unsintered, matrix or zigzag internal electrode layer patterns formed on the surface of the green sheet of the first sheet. Furthermore, the ceramic slurry is printed on the surface of the green sheet of a first sheet and then dried, after which the electrode paste is printed and then dried, to produce a third sheet having unsintered, striped insulative layer patterns formed on the surface of the green sheet of the first sheet, where both first-direction ends of each unsintered insulative layer pattern are covered by a band-shaped unsintered second base conductor film pattern.

Next, a specified number of unit sheets taken from the green sheet of the first sheet are stacked and thermally compressed one by one, to form an area corresponding to one dielectric margin part 11b. Then, a specified number of unit sheets (including unsintered internal electrode layer patterns) taken from the green sheet of the second sheet are stacked and thermally compressed one by one, to form an area corresponding to the capacitive part 11a. Then, a specified number of unit sheets taken from the green sheet of the first sheet are stacked and thermally compressed one by one, to form an area corresponding to the other dielectric margin part 11b. Then, unit sheets (including unsintered insulative layer patterns and unsintered second base conductor film patterns) taken from the green sheet of the third sheet are stacked and thermally compressed on both sides of the above sheets in their stacking direction, after which the entire sheets are thermally compressed one last time, to produce an unsintered multilayer sheet (refer to FIG. 12A). It should be noted that, although the unsintered multilayer sheet depicted in FIG. 12A corresponds to one multilayer ceramic capacitor 20 as mentioned above for the sake of illustration, the actual unsintered multilayer sheet has sufficient size to allow multiple multilayer ceramic capacitors 20 to be taken from it.

Next, the unsintered multilayer sheet having sufficient size to allow multiple multilayer ceramic capacitors to be taken from it, is cut into a grid to produce unsintered capacitor bodies (11) (refer to FIG. 12A). On each such unsintered capacitor body (11), an unsintered first insulative layer (13-1) and unsintered second base conductor films (16) covering both first-direction ends of the unsintered first insulative layer are provided on one third-direction face (bottom face in FIG. 12A), and an unsintered second insulative layer (13-2) and unsintered second base conductor films (16) covering both first-direction ends of the unsintered second insulative layer are provided on the other third-direction face (top face in FIG. 12A).

Next, both first-direction ends of the unsintered capacitor body (11) having the unsintered first insulative layer (13-1), unsintered second insulative layer (13-2), and four unsintered second base conductor films (16) are dipped in or otherwise coated with the electrode paste, and then the electrode paste is dried, to produce unsintered base conductor films (14) (refer to FIG. 12B). These unsintered base conductor films (14) are produced in such a way that the edges of the first part (14b) and those of the second part (14c) of each of the unsintered base conductor films (14) do not contact the edges of the unsintered second base conductor films (16), so that the clearance CL shown in FIG. 11 can be ensured.

Next, the multiple unsintered capacitor bodies (11), each having the unsintered first insulative layer (13-1), unsintered second insulative layer (13-2), four unsintered second base conductor films (16), and two unsintered base conductor films (14), are introduced to a sintering oven and sintered (including a binder removal process and a sintering process) all at once in a reducing ambience based on a temperature profile appropriate for barium titanate and nickel, to produce capacitor bodies 11, each having a first insulative layer 13-1, a second insulative layer 13-2, four second base conductor films 16, and two base conductor films 14 (refer to FIG. 12B).

Next, a surface conductor film 15 (primary component: tin) continuously covering the surface of each base conductor film 14 and that of each second base conductor film 16 is produced according to the wet plating method or dry plating method (refer to FIG. 12C). This completes the manufacturing of the multilayer ceramic capacitor 20.

It should be noted that each base conductor film 14 may also be produced by sintering the unsintered capacitor body (11) shown in FIG. 12A to produce a capacitor body 11 having a first insulative layer 13-1, a second insulative layer 13-2, and four second base conductor films 16, and then dipping or otherwise coating both first-direction ends of this capacitor body 11 in/with the electrode paste and drying the electrode paste, followed by baking. Also, each second base conductor film 16 may be produced by producing a capacitor body 11 that corresponds to the capacitor body 11 shown in FIG. 12B without each second base conductor film 16, and then dipping or otherwise coating both third-direction faces of this capacitor body 11 in/with the electrode paste and drying the electrode paste, followed by baking, or using the dry plating method to form, on each of the two third-direction faces of this capacitor body 11, a conductor film that will become each second base conductor film 16.

Next, the effects achieved by the multilayer ceramic capacitor 20 are explained.

[Effect 2-1]

Even when the multilayer ceramic capacitor 20 is made thin, or specifically when the third-direction dimension of each dielectric margin part 11b is made small, moisture intrusion into the capacitor body 11 from both third-direction faces of the capacitor body 11 can be prevented as much as possible by the first insulative layer 13-1 which has the parts B1, B2 provided on one third-direction face of the capacitor body 11 and covered by the first part 12b of each external electrode 12, and also by the second insulative layer 13-2 which has the parts B3, B4 provided on the other third-direction face of the capacitor body 11 and covered by the second part 12c of each external electrode 12. Furthermore, because the parts B1, B2 of the first insulative layer 13-1 are covered in such a way that their other third-direction face is contacting one third-direction face of the capacitor body 11 and their one third-direction face is contacting the second base conductor film 16, and also because the parts B3, B4 of the second insulative layer 13-2 are covered in such a way that their one third-direction face is contacting the other third-direction face of the capacitor body 11 and their other third-direction face is contacting the second base conductor film 16, moisture intrusion into the capacitor body 11 from around both first-direction ends of the first insulative layer 13-1 and around both first-direction ends of the second insulative layer 13-2, can also be prevented as much as possible.

[Effect 2-2]

Also, because the third-direction dimension t2 of the first insulative layer 13-1 is smaller than the third-direction dimension t1 of the first part 12b of each external electrode 12 while the third-direction dimension t2 of the second insulative layer 13-2 is smaller than the third-direction dimension t1 of the second part 12c of each external electrode 12, or specifically because the third-direction dimension t2 of the first insulative layer 13-1 is smaller than the third-direction dimension t1c of each second base conductor film 16 while the third-direction dimension t2 of the second insulative layer 13-2 is smaller than the third-direction dimension t1c of each second base conductor film 16, any increase in the third-direction dimension t1 of the first part 12b or increase in the third-direction dimension t1 of the second part 12c, of each external electrode 12, or in other words any increase in the third-direction dimension H of the multilayer ceramic capacitor 10, can be suppressed without fail.

[Effect 2-3]

Furthermore, an action to supplement the strength of the capacitor body 11 is achieved by the first insulative layer 13-1 provided on one third-direction face, and the second insulative layer 13-2 provided on the other third-direction face, of the capacitor body 11, which means that the strength of the capacitor body 11 can be improved even when the third-direction dimension of the capacitor body 11 is made small in order to make the multilayer ceramic capacitor 10 thin.

[Effect 2-4]

Furthermore, the parts B1, B2 of the first insulative layer 13-1 are covered by the second base conductor films 16 of each external electrode 12, while the parts B3, B4 of the second insulative layer 13-2 are covered by the second base conductor films 16 of each external electrode 12, which means that, even when a surface conductor film 15 is produced on the surface of each second base conductor film 16 and that of each base conductor film 14 according to the wet plating method or dry plating method, each surface conductor film 15 can be produced in an appropriate manner.

Third Embodiment

Figure 13:
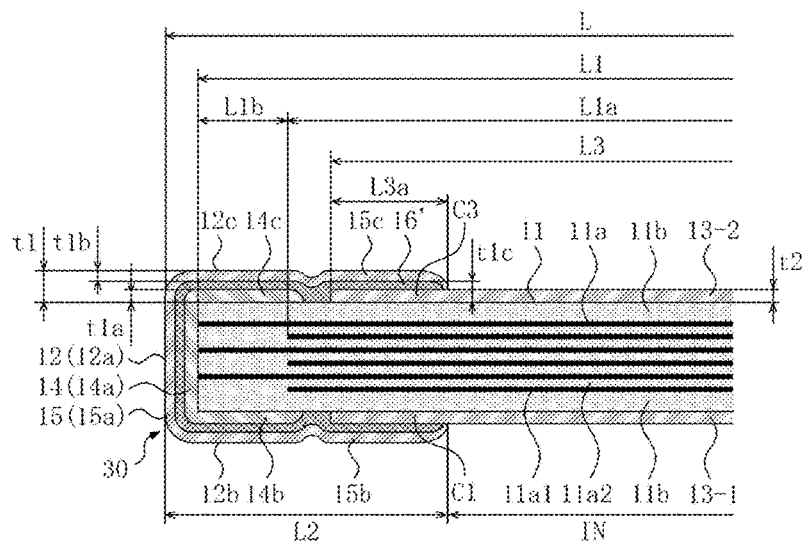
FIG. 13 is a drawing corresponding to FIG. 11 of the multilayer ceramic capacitor pertaining to the third embodiment of the present invention.

The third embodiment applies the present invention to a multilayer ceramic capacitor. First, FIGS. 13 to 14C are used to explain the structure of the multilayer ceramic capacitor 30 pertaining to the third embodiment of the present invention. It should be noted that, for the sake of convenience, in the following explanations the direction across two opposing faces (corresponding to the lateral direction in FIG. 14C) among the six faces of the below-mentioned capacitor body 11 of roughly rectangular solid shape is denoted as the first direction, the direction across other two faces (corresponding to the longitudinal direction in FIG. 14C) is denoted as the second direction, and the direction across the remaining two opposing faces (corresponding to the vertical direction in FIG. 14C) is denoted as the third direction, while the dimensions along the respective directions are denoted as the first-direction dimension, second-direction dimension and third-direction dimension. Also, in FIGS. 13 and 14C, the same symbols are used for those parts having the same names as the corresponding parts of the multilayer ceramic capacitor 20. For reference, the first-direction dimension L, second-direction dimension W, and third-direction dimension H of the prototype (multilayer ceramic capacitor) on which FIGS. 13 to 14C are based, are 1000 μm, 500 μm, and 150 μm, respectively.

With this multilayer ceramic capacitor 30, the structure of each external electrode 12 is different from the structure of each external electrode 12 of the multilayer ceramic capacitor 20. The remainder is the same as the structure of the multilayer ceramic capacitor 20 and therefore the same symbols are used and explanations are omitted.

As is evident from FIGS. 13 and 14C, each external electrode 12 of the multilayer ceramic capacitor 30 is constituted by a base conductor film 14, a second base conductor film 16', and a surface conductor film 15 covering the second base conductor film 16', which is structurally different from each external electrode 12 of the multilayer ceramic capacitor 20 in that:

the first-direction dimension (not accompanied by symbol) of the base part 14a of the base conductor film 14, the third-direction dimension t1a of the first part 14b, and that of the second part 14c, and the second-direction dimension (not accompanied by symbol) of the third part 14d and that of the fourth part 14e, of each external electrode 12, have been reduced, respectively; and the second base conductor film 16' of each external electrode 12 has been extended to cover the surface of each base conductor film 14.

In other words, each second base conductor film 16' continuously has a base part (not accompanied by symbol) contacting the surface of the base part 14a of each base conductor film 14, a first part (not accompanied by symbol) contacting the surface of the first part 14b of each base conductor film 14 and contactively covering both first-direction ends of the first insulative layer 13-1, a second part (not accompanied by symbol) contacting the surface of the second part 14c of each base conductor film 14 and contactively covering both first-direction ends of the second insulative layer 13-2, a third part (not accompanied by symbol) contacting the surface of the third part 14d of each base conductor film 14, and a fourth part (not accompanied by symbol) contacting the surface of the fourth part 14e of each base conductor film 14. The dimension of the part of each second base conductor film 16' covering the surface of each base conductor film 14 (third-direction dimension of a part of the first part and that of a part of the second part, and the second-direction dimension of the third part and that of the fourth part) is smaller than the third-direction dimension t1c of the remainder of the first part of each second base conductor film 16' covering both first-direction ends of the first insulative layer 13-1, and also smaller than the third-direction dimension t1c of the remainder of the second part of each second base conductor film 16' covering both first-direction ends of the second insulative layer 13-2.

Also, the first insulative layer 13-1 has, on both of its first-direction ends, parts C1, C2 covered by the first part 12b of each external electrode 12 (refer to FIG. 14C). To be specific, these parts C1, C2 are covered in such a way that their other third-direction face (top face in FIG. 14C) is contacting one third-direction face (bottom face in FIG. 14C) of the capacitor body 11 and their one third-direction face (bottom face in FIG. 14C) is contacting the remainder of the first part of each second base conductor film 16'. On the other hand, the second insulative layer 13-2 has, on both of its first-direction ends, parts C3, C4 covered by the second part 12c of each external electrode 12 (refer to FIG. 14C). To be specific, these parts C3, C4 are covered in such a way that their one third-direction face (bottom face in FIG. 14C) is contacting the other third-direction face (top face in FIG. 14C) of the capacitor body 11 and their other third-direction face (top face in FIG. 14C) is contacting the remainder of the second part of each second base conductor film 16'. Furthermore, both first-direction ends of the first insulative layer 13-1 are separated from the first part 14b of each base conductor film 14, respectively, while both first-direction ends of the second insulative layer 13-2 are separated from the second part 14c of each base conductor film 14, respectively.

Figure 14A:
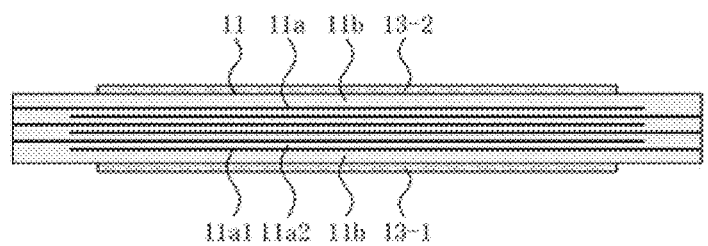
FIGS. 14A to 14C are drawings explaining an example of how the multilayer ceramic capacitor shown in FIG. 13 is manufactured.
Figure 14B:
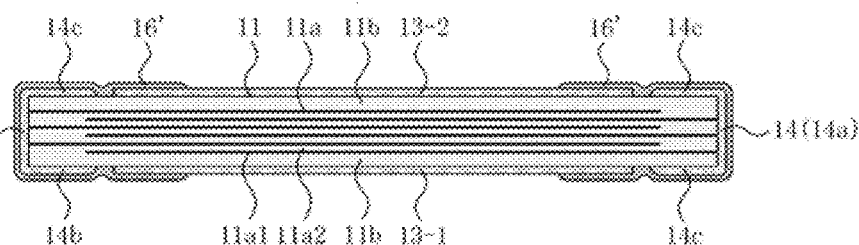
Figure 14C:
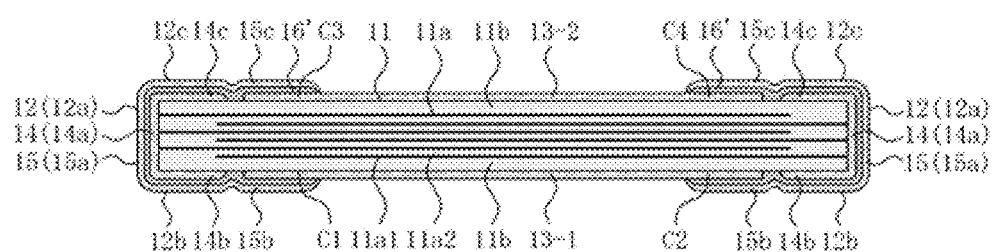

Next, an example of how the multilayer ceramic capacitor 30 is manufactured, or specifically an example of manufacturing method when the primary component of the capacitor body 11 excluding the internal electrode layers 11a1, primary component of the first insulative layer 13-1, and that of the second insulative layer 13-2 are barium titanate, the primary component of each internal electrode layer 11a1, that of each base conductor film 14, and that of each second base conductor film 16' are nickel, and the primary component of each surface conductor film 15 is tin, is explained using FIGS. 14A to 14C and quoting the symbols shown in FIG. 13. The manufacturing method explained here is only an example and does not limit in any way how the multilayer ceramic capacitor 30 is manufactured.

For the manufacturing, first a ceramic slurry containing barium titanate powder, organic solvent, organic binder, dispersant, etc., and an electrode paste containing nickel powder, organic solvent, organic binder, dispersant, etc., are prepared.

Next, the ceramic slurry is coated on the surface of a carrier film and then dried, to produce a first sheet having a green sheet formed on the surface of the carrier film. Also, the electrode paste is printed on the surface of the green sheet of a first sheet and then dried, to produce a second sheet having unsintered, matrix or zigzag internal electrode layer patterns formed on the surface of the green sheet of the first sheet. Furthermore, the ceramic slurry is printed on the surface of the green sheet of a first sheet and then dried, to produce a third sheet having unsintered, striped insulative layer patterns formed on the surface of the green sheet of the first sheet.

Next, a specified number of unit sheets taken from the green sheet of the first sheet are stacked and thermally compressed one by one, to form an area corresponding to one dielectric margin part 11b. Then, a specified number of unit sheets (including unsintered internal electrode layer patterns) taken from the green sheet of the second sheet are stacked and thermally compressed one by one, to form an area corresponding to the capacitive part 11a. Then, a specified number of unit sheets taken from the green sheet of the first sheet are stacked and thermally compressed one by one, to form an area corresponding to the other dielectric margin part 11b. Then, unit sheets (including unsintered insulative layer patterns) taken from the green sheet of the third sheet are stacked and thermally compressed on both sides of the above sheets in their stacking direction, after which the entire sheets are thermally compressed one last time, to produce an unsintered multilayer sheet (refer to FIG. 14A). It should be noted that, although the unsintered multilayer sheet depicted in FIG. 14A corresponds to one multilayer ceramic capacitor 30 as mentioned above for the sake of illustration, the actual unsintered multilayer sheet has sufficient size to allow multiple multilayer ceramic capacitors 30 to be taken from it.

Next, the unsintered multilayer sheet having sufficient size to allow multiple multilayer ceramic capacitors to be taken from it, is cut into a grid to produce unsintered capacitor bodies (11) (refer to FIG. 14A). On each such unsintered capacitor body (11), an unsintered first insulative layer (13-1) is provided on one third-direction face (bottom face in FIG. 14A), and an unsintered second insulative layer (13-2) is provided on the other third-direction face (top face in FIG. 14A).

Next, both first-direction ends of the unsintered capacitor body (11) having the unsintered first insulative layer (13-1) and unsintered second insulative layer (13-2) are dipped in or otherwise coated with the electrode paste, and then the electrode paste is dried, to produce unsintered base conductor films (14) (refer to FIG. 14B). These unsintered base conductor films (14) are produced in such a way that the edges of the first part (14b) and those of the second part (14c) of each of the unsintered base conductor films (14) do not contact the unsintered first insulative layer (13-1) and unsintered second insulative layer (13-2), respectively.

Next, the electrode paste is coated on both first-direction ends of the unsintered capacitor body (11) having the unsintered first insulative layer (13-1), unsintered second insulative layer (13-2), and two unsintered base conductor films (14), and then dried, to produce unsintered second base conductor films (16') (refer to FIG. 14B). These unsintered second base conductor films (16') are produced in such a way that the remainder of the first part and that of the second part, of each of the unsintered second base conductor films (16'), cover both first-direction ends of the unsintered first insulative layer (13-1) and both first-direction ends of the unsintered second insulative layer (13-2), respectively.

Next, the multiple unsintered capacitor bodies (11), each having the unsintered first insulative layer (13-1), unsintered second insulative layer (13-2), two unsintered base conductor films (14), and two unsintered second base conductor films (16'), are introduced to a sintering oven and sintered (including a binder removal process and a sintering process) all at once in a reducing ambience based on a temperature profile appropriate for barium titanate and nickel, to produce capacitor bodies 11, each having a first insulative layer 13-1, a second insulative layer 13-2, two base conductor films 14, and two second base conductor films 16' (refer to FIG. 14B).

Next, a surface conductor film 15 (primary component: tin) covering the surface of each second base conductor film 16' is produced according to the wet plating method or dry plating method (refer to FIG. 14C). This completes the manufacturing of the multilayer ceramic capacitor 30.

It should be noted that each base conductor film 14 and each second base conductor film 16' may also be produced by sintering the unsintered capacitor body (11) shown in FIG. 14A to produce a capacitor body 11 having a first insulative layer 13-1 and a second insulative layer 13-2, and then coating both first-direction ends of this capacitor body 11 with the electrode paste and drying the electrode paste, followed by baking. Also, each second base conductor film 16' may be produced by producing a capacitor body 11 that corresponds to the capacitor body 11 shown in FIG. 14B without each second base conductor film 16', and then coating both first-direction ends of this capacitor body 11 with the electrode paste and drying the electrode paste, followed by baking, or using the dry plating method to form, on each of the two first-direction ends of this capacitor body 11, a conductor film that will become each second base conductor film 16'.

Next, the effects achieved by the multilayer ceramic capacitor 30 are explained.

[Effect 3-1]

Even when the multilayer ceramic capacitor 30 is made thin, or specifically when the third-direction dimension of each dielectric margin part 11b is made small, moisture intrusion into the capacitor body 11 from both third-direction faces of the capacitor body 11 can be prevented as much as possible by the first insulative layer 13-1 which has the parts C1, C2 provided on one third-direction face of the capacitor body 11 and covered by the first part 12b of each external electrode 12 (refer to FIG. 14C), and also by the second insulative layer 13-2 which has the parts C3, C4 provided on the other third-direction face of the capacitor body 11 and covered by the second part 12c of each external electrode 12 (refer to FIG. 14C). Furthermore, because the parts C1, C2 of the first insulative layer 13-1 are covered in such a way that their other third-direction face is contacting one third-direction face of the capacitor body 11 and their one third-direction face is contacting the remainder of the first part of each second base conductor film 16' of the capacitor body 11, and also because the parts C3, C4 of the second insulative layer 13-2 are covered in such a way that their one third-direction face is contacting the other third-direction face of the capacitor body 11 and their other third-direction face is contacting the remainder of the second part of each second base conductor film 16' of the capacitor body 11, moisture intrusion into the capacitor body 11 from around both first-direction ends of the first insulative layer 13-1 and around both first-direction ends of the second insulative layer 13-2, can also be prevented as much as possible.

[Effect 3-2]

Also, because the third-direction dimension t2 of the first insulative layer 13-1 is smaller than the third-direction dimension t1 of the first part 12b of each external electrode 12 while the third-direction dimension t2 of the second insulative layer 13-2 is smaller than the third-direction dimension t1 of the second part 12c of each external electrode 12, or specifically because the third-direction dimension t2 of the first insulative layer 13-1 is smaller than the third-direction dimension t1c of the remainder of the first part of each second base conductor film 16' while the third-direction dimension t2 of the second insulative layer 13-2 is smaller than the third-direction dimension t1c of the remainder of the first part of each second base conductor film 16', any increase in the third-direction dimension t1 of the first part 12b or increase in the third-direction dimension t1 of the second part 12c, of each external electrode 12, or in other words any increase in the third-direction dimension H of the multilayer ceramic capacitor 10, can be suppressed without fail.

[Effect 3-3]

Furthermore, an action to supplement the strength of the capacitor body 11 is achieved by the first insulative layer 13-1 provided on one third-direction face, and the second insulative layer 13-2 provided on the other third-direction face, of the capacitor body 11, which means that the strength of the capacitor body 11 can be improved even when the third-direction dimension of the capacitor body 11 is made small in order to make the multilayer ceramic capacitor 10 thin.

[Effect 3-4]

Furthermore, the parts C1, C2 of the first insulative layer 13-1 are covered by the remainder of the first part of the second base conductor film 16' of each external electrode 12, while the parts C3, C4 of the second insulative layer 13-2 are covered by the remainder of the second part of the second base conductor film 16' of each external electrode 12, which means that, even when a surface conductor film 15 is produced on the surface of each second base conductor film 16' and that of each base conductor film 14 according to the wet plating method or dry plating method, each surface conductor film 15 can be produced in an appropriate manner.

Other Embodiments (M1) The multilayer ceramic capacitors 10, 20, 30 described in the first embodiment through third embodiment had the first insulative layer 13-1 and second insulative layer 13-2 provided on both third-direction faces of the capacitor body 11, respectively; however, a structure where either the first insulative layer 13-1 or second insulative layer 13-2 is eliminated can also be adopted.

(M2) The external electrodes 12 described in the first embodiment through third embodiment continuously had the base part 12a and the first part 12b through fourth part 12e; however, the shape of each external electrode 12 may also be such that there is no third part 12d or fourth part 12e, if the first part 12b or second part 12c of each external electrode 12 is to be utilized when the multilayer ceramic capacitor 10, 20, 30 is placed on the surface of or inside a circuit board and connected to wiring.

(M3) The multilayer ceramic capacitors 10, 20, 30 described in the first embodiment through third embodiment were based on a prototype whose first-direction dimension L, second-direction dimension W, and third-direction dimension H were 1000 μm, 500 μm, and 150 μm, respectively; however, the first-direction dimension L, second-direction dimension W, and third-direction dimension H may be set to values other than the above values.

(M4) The multilayer ceramic capacitors 10, 20, 30 described in the first embodiment through third embodiment were based on a prototype whose first-direction dimension L, second-direction dimension W, and third-direction dimension H were 1000 μm, 500 μm, and 150 μm, respectively; however, the relationship of the first-direction dimension L, second-direction dimension W, and third-direction dimension H may be "L>W=H," "L>H>W," "W>L>H," "W>L=H," "W>H>L," etc.

(M5) The first embodiment through third embodiment explained the structure, etc., of a multilayer ceramic capacitor to which the present invention was applied; however, the present invention is not limited to multilayer ceramic capacitors, and it can also be applied to multilayer ceramic inductors and other multilayer ceramic electronic components comprising external electrodes that are provided on a component body of roughly rectangular solid shape having internal conductor layers.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A multilayer ceramic electronic component comprising:
   (i) a component body of roughly rectangular solid shape having internal conductor layers, and
   (ii) external electrodes that are provided on the component body, wherein:
   when a direction across two opposing faces among six faces of the component body is defined as a first direction, a direction across other two opposing faces is defined as a second direction wherein the internal conductor layers each extend on a plane defined by the first and second directions, and a direction across remaining two opposing faces is defined as a third direction which is a thickness direction of the internal conductor layers, then the external electrodes each have a first part present on one third-direction face of the component body, and
   (iii) an insulative layer provided on the one third-direction face of the component body and having a part covered by the first part of each external electrode, wherein, among first-direction faces, second-direction faces, and the one third-direction face, the insulative layer is provided solely on the one third-direction face,
   wherein the first part of each external electrode has a base conductor film and a surface conductor film covering the base conductor film, and a third-direction dimension of the insulative layer is smaller than a third-direction dimension of the base conductor film at the first part of each external electrode.

2. The multilayer ceramic electronic component according to claim 1, wherein the external electrodes are provided on both first-direction ends of the component body, respectively, and the part of the insulative layer covered by the first part of each external electrode is provided on the one third-direction face at each of the two first-direction ends.

3. The multilayer ceramic electronic component according to claim 1, wherein the external electrodes each have a second part present on another third-direction face of the component body, and a second insulative layer having a part covered by the second part of each external electrode is provided on the other third-direction face of the component body.

4. The multilayer ceramic electronic component according to claim 3, wherein a third-direction dimension of the second insulative layer is smaller than a third-direction dimension of the second part of the external electrode.

5. The multilayer ceramic electronic component according to claim 1, wherein the multilayer ceramic electronic component is a multilayer ceramic capacitor, and the component body has a capacitive part constituted by multiple internal electrode layers that are stacked together with dielectric layers in between.

6. A multilayer ceramic electronic component comprising:
   (i) a component body of roughly rectangular solid shape having internal conductor layers, and
   (ii) external electrodes that are provided on the component body, wherein:
   when a direction across two opposing faces among six faces of the component body is defined as a first direction, a direction across other two opposing faces is defined as a second direction wherein the internal conductor layers each extend on a plane defined by the first and second directions, and a direction across remaining two opposing faces is defined as a third direction which is a thickness direction of the internal conductor layers, then the external electrodes each have a first part present on one third-direction face of the component body, and
   (iii) an insulative layer provided on the one third-direction face of the component body and having a part covered by the first part of each external electrode, wherein, among first-direction faces, second-direction faces, and the one third-direction face, the insulative layer is provided solely on the one third-direction face,
   wherein the external electrodes are provided on both first-direction ends of the component body, respectively, and the part of the insulative layer covered by the first part of each external electrode is provided on the one third-direction face at each of the two first-direction ends,
   wherein a first-direction dimension of the insulative layer is smaller than a first-direction dimension of the component body and greater than a first-direction interval between the first parts of the external electrodes.

7. The multilayer ceramic electronic component according to claim 6, wherein a third-direction dimension of the insulative layer is smaller than a third-direction dimension of the first part of each external electrode.

8. A multilayer ceramic electronic component comprising:
   (i) a component body of roughly rectangular solid shape having internal conductor layers, and
   (ii) external electrodes that are provided on the component body, wherein:
   when a direction across two opposing faces among six faces of the component body is defined as a first direction, a direction across other two opposing faces is defined as a second direction wherein the internal conductor layers each extend on a plane defined by the first and second directions, and a direction across remaining two opposing faces is defined as a third direction which is a thickness direction of the internal conductor layers, then the external electrodes each have a first part present on one third-direction face of the component body, and
   (iii) an insulative layer provided on the one third-direction face of the component body and having a part covered by the first part of each external electrode, wherein, among first-direction faces, second-direction faces, and the one third-direction face, the insulative layer is provided solely on the one third-direction face,
   wherein the external electrodes each have a second part present on another third-direction face of the component body, and a second insulative layer having a part covered by the second part of each external electrode is provided on the other third-direction face of the component body,
   wherein the second part of each external electrode has a base conductor film and a surface conductor film covering the base conductor film, and a third-direction dimension of the second insulative layer is smaller than a third-direction dimension of the base conductor film at the second part of each external electrode.

9. The multilayer ceramic electronic component according to claim 8, wherein the external electrodes are provided on both first-direction ends of the component body, respectively, and the part of the second insulative layer covered by the second part of each external electrode is provided on the other third-direction face at each of two first-direction ends.

10. The multilayer ceramic electronic component according to claim 9, wherein a first-direction dimension of the second insulative layer is smaller than a first-direction dimension of the component body and greater than a first-direction interval between the second parts of the external electrodes.

* * * * *